United States Patent [19]
Ataee

[11] Patent Number: 5,872,670
[45] Date of Patent: Feb. 16, 1999

[54] METHODS AND APPARATUS FOR PREVENTING DISK DRIVE DAMAGE BY PARKING A TRANSDUCER DURING MICROPROCESSOR FAILURES

[75] Inventor: Mehran Ataee, Cupertino, Calif.

[73] Assignee: Quantum Corporation, Milpitas, Calif.

[21] Appl. No.: 797,390

[22] Filed: Feb. 7, 1997

[51] Int. Cl.[6] ................................................. G11B 15/18
[52] U.S. Cl. .............................. 360/69; 360/75; 360/71; 395/182.22
[58] Field of Search .................................... 360/69, 77.03, 360/77.04, 75, 73.03; 318/368, 678; 395/184.01, 185.01, 182.22

[56] References Cited

U.S. PATENT DOCUMENTS

| | | | |
|---|---|---|---|
| 4,268,905 | 5/1981 | Johann et al. | 364/200 |
| 4,375,611 | 3/1983 | Greig | 318/626 |
| 4,683,568 | 7/1987 | Urban | 371/12 |
| 5,495,156 | 2/1996 | Wilson et sal. | 318/368 |
| 5,600,217 | 2/1997 | Bartlett | 318/434 |
| 5,633,568 | 5/1997 | Dunfield | 318/254 |

*Primary Examiner*—Aristotelis M. Psitos
*Assistant Examiner*—John M. Vann
*Attorney, Agent, or Firm*—Beyer & Weaver; John C. Chen

[57] ABSTRACT a An apparatus for preventing damage to components of a hard disk drive having a microprocessor when the microprocessor fails. The hard disk drive further includes at least one read/write head and a data storage disk having a designated parking zone. The apparatus includes a microprocessor monitoring circuit configured to be coupled to the microprocessor. The microprocessor monitoring circuit is configured for detecting a microprocessor failure condition in the microprocessor. The apparatus further includes a head park circuit coupled to the microprocessor monitoring circuit. The head park circuit is configured to receive a park command from the microprocessor monitoring circuit when the microprocessor failure condition is detected by the microprocessor monitoring circuit. The head park circuit, upon a receipt of the park command, parks the at least one read/write head of the hard disk drive over the designated parking zone, whereby the microprocessor monitoring circuit issues the park command to cause the parking of the at least one read/write head without intervention from the microprocessor when the microprocessor failure condition is detected by the microprocessor monitoring circuit.

20 Claims, 4 Drawing Sheets

table of data …

METHODS AND APPARATUS FOR PREVENTING DISK DRIVE DAMAGE BY PARKING A TRANSDUCER DURING MICROPROCESSOR FAILURES

BACKGROUND OF THE INVENTION

The present invention relates to hard disk drives. More particularly, the present invention relates to methods and apparatus for preventing damage to the components of the hard disk drive such as the read/write head, the disk surface, and/or the spindle motor in the event of a microprocessor failure.

Hard disk drives have long been employed for storing data in computer systems. To facilitate discussion, FIG. 1 is a simplified diagram of a hard disk drive 100, representing a hard disk drive known in the art. Hard disk drive 100 includes one or more data storage disks 102, which spins around a spindle by spindle motor 104. A read/write (R/W) head 106 couples to an actuator arm 108, which is urged by a voice coil 110 to move R/W head 106 between the inner diameter (ID) 112 and the outer diameter 114 of disk 102 to access data stored on the surface of disk 102. Although only one disk 102 and one actuator arm 108 are shown for simplicity, it should be understood that a typical hard disk drive may include multiple disks stacked in a spaced apart relationship. Each disk may be accessed both at its upper and lower surfaces by actuator arms, which are coupled to an actuator arm assembly comprising multiple actuator arms.

Voice coil 110 is controlled by a microcontroller or microprocessor 114 via a digital-to-analog (DAC) converter 116 and voice control motor (VCM) driver 117, which is shown disposed in a VCM circuit 118, all of which are conventional in construction. It should be noted that the term "microprocessor" is employed herein to also include microcontrollers, or any set of logic circuits capable of performing functions typically expected of a microprocessor. VCM circuit 118 and optionally DAC 116 may be implemented as a single chip, e.g., using a class of devices known as Application Specific Integrated Circuits (ASICs). During operation, microprocessor 114 communicates with a spindle motor driver circuit 120, which controls, among others, the rotation speed of spindle motor 104.

As is well known to those skilled, R/W head 106 does not physically contact the surface of disk 102 when reading data from or writing data to disk 102. More typically, R/W head 106 glides over the surface of disk 102 on a thin layer of air as disk 102 spins. When disk 102 stops spinning, voice coil 110 typically brings R/W head 106 over a designated landing zone on disk 102 to enable R/W head to safely "park." In the example of FIG. 1, the landing zone is shown as concentric landing zone 122, which is adjacent to ID 112 in FIG. 1.

If the power supplied to hard disk drive 100 is uninterrupted and microprocessor 114 has not failed, microprocessor 114 itself can always park R/W head 106 in the landing zone when data access is no longer desired. If power is interrupted, microprocessor 114 would of course be no longer able to perform this parking function. In recognition of this problem, there are provided in the prior art techniques for detecting the power loss condition via an appropriate power monitor circuit, e.g., power monitor circuit 124. Upon detecting a power loss condition, the back EMF (electromotive force) of spindle motor 104 is employed to generate power to a parking circuit 126, which then parks R/W head 106 in the designated landing zone. The use of the back EMF in this manner is well known and is not discussed in detail herein order not to unnecessarily obscure the invention.

While the prior art technique is effective at preventing R/W head 106 from crashing into the media-containing portion on the surface of disk 102 when a power loss condition occurs, there are some disadvantages. For example, it is recognized by the inventor herein that head crashes occur not only upon the occurrence of a power loss condition but may also occur when the microprocessor, e.g., microprocessor 114 fails. In this case, a head crash into the data zone may occur even when there is no power interruption to hard disk drive 100.

More often than not, a microprocessor failure negates the use of the microprocessor as the controlling device for voice coil 110. When this happens microprocessor 114 cannot be counted on to reliably bring, via voice coil 110, actuator arm 108 (and R/W head 106) to the position where safe landing occurs. Since power loss is not detected, power monitor circuit 124 does not issue the command for head park circuit 126 to park R/W 106 in the landing zone. Accordingly, R/W head 106 simply crash lands on the data-containing zone of the surface of disk 102.

For most drives, this crash landing causes damage to the data zone where R/W head 106 impacts. It may be possible, in some instances, for the head to be airborne again when the disk is subsequently started up, and the damage, however unpleasant, is fairly localized.

For some newer drive designs, however, the crash landing of the R/W head on a data zone is nearly always fatal. By way of example, when a type of R/W head known as magneto-resistive head is employed in a drive, the disk surface is typically very smooth to accommodate the low-flying head, e.g., flying at 2 micro-inches above the data-containing disk surface or even lower. It has been found that the smooth mating between the head and the polished disk surface, if such is ever allowed to occur, may give rise to a very high stiction force, i.e., the force existing between the disk surface and the head that resists a subsequent separation.

The stiction force in some disk drive design may be so high that it would be impossible to separate the head from the smooth disk surface after they make contact. In some cases, it is simply impossible to spin up the disk again. In other cases, the drive cannot be started up again without ripping out the head and/or causing severe damage to the disk surface. For these types of drives, therefore, it is necessary to always park the head at a section of the disk surface where safe landing may occur, e.g., where surface texture is introduced to reduce the stiction force.

Additionally, microprocessor failure may cause spurious data to be sent to spindle motor driver circuit 120, which may, in some instances, cause spindle motor 104 to draw an excessive amount of current. Again, since the microprocessor has failed, it cannot be counted on to correct the situation. If too much current is drawn by spindle motor 104, irreversible damage to the motor components may occur.

In view of the foregoing, there are desired improved methods and apparatus for preventing damage to the components of the hard disk drive such as the read/write head, the disk surface, and/or the spindle motor in the event of microprocessor failure and without requiring the intervention of the microprocessor. To minimize costs, the improved methods and apparatus preferably require minimal re-engineering of existing drive designs in their implementation.

SUMMARY OF THE INVENTION

The invention relates, in one embodiment, to a method, in a hard disk drive having microprocessor, at least one read/ write head and at least one data storage disk, for preventing damage to the hard disk drive when the microprocessor fails. The method includes coupling a microprocessor monitoring circuit to the microprocessor and configuring the microprocessor monitoring circuit to detect a microprocessor failure condition on the microprocessor. The method further includes coupling the microprocessor monitoring circuit to a head park circuit. The head park circuit is configured to park the at least one read/write head of the hard disk drive over a designated zone defined on the at least one data storage disk when the microprocessor failure condition is detected by the microprocessor monitoring circuit.

In another embodiment, the invention relates to an apparatus for preventing damage to components of a hard disk drive having a microprocessor when the microprocessor fails. The hard disk drive further includes at least one read/write head and a data storage disk having a designated parking zone. The apparatus includes a microprocessor monitoring circuit configured to be coupled to the microprocessor. The microprocessor monitoring circuit is configured for detecting a microprocessor failure condition in the microprocessor.

The apparatus further includes a head park circuit coupled to the microprocessor monitoring circuit. The head park circuit is configured to receive a park command from the microprocessor monitoring circuit when the microprocessor failure condition is detected by the microprocessor monitoring circuit. The head park circuit, upon a receipt of the park command, parks the at least one read/write head of the hard disk drive over the designated parking zone, whereby the microprocessor monitoring circuit issues the park command to cause the parking of the at least one read/write head without intervention from the microprocessor when the microprocessor failure condition is detected by the microprocessor monitoring circuit.

These and other advantages of the present invention will become apparent upon reading the following detailed descriptions and studying the various figures of the drawings.

DESCRIPTION OF THE DRAWINGS

To facilitate discussion.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

In accordance with one aspect of the present invention, there is provided a microprocessor monitoring circuit, which is coupled to the microprocessor, for detecting a microprocessor failure condition. When a microprocessor failure condition is detected, the inventive microprocessor monitoring circuit causes, without further intervention from the microprocessor, the head to be parked over the appropriate landing zone of the disk, e.g., by issuing the park command directly from the microprocessor monitor circuit to the head park circuit (such as head park circuit 126 of FIG. 1).

Figure 1:
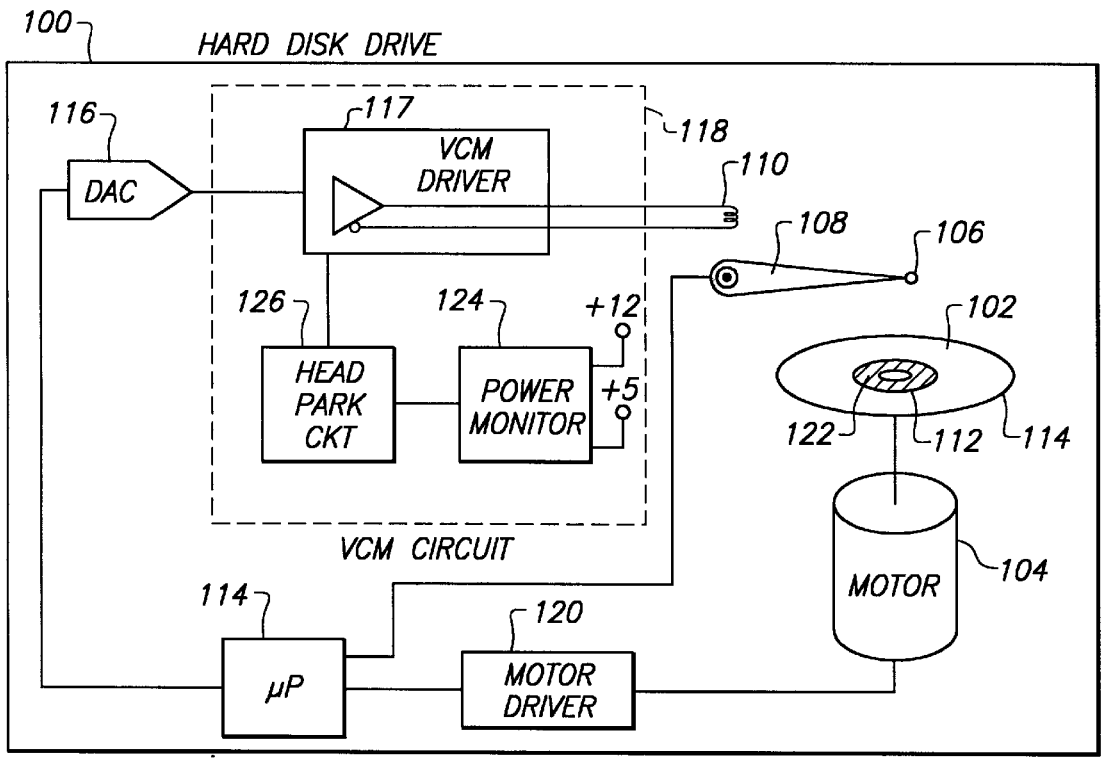
FIG. 1 is a simplified diagram of a prior art hard disk drive.

In another embodiment, the inventive microprocessor monitoring circuit also resets the spindle motor driver circuit, e.g., spindle motor driver circuit 120 of FIG. 1, upon detection of a microprocessor failure condition. Again, the inventive microprocessor monitoring circuit performs the reset on its own without further intervention from the microprocessor.

Note that in the previous two embodiments, it is assumed that the hard disk drive continues to receive power, which enables the microprocessor monitoring circuit to perform its actions. In yet another embodiment, the invention combines the inventive disk drive component damage prevention technique with existing techniques to address the deficiencies of prior art techniques, thereby forming a more complete solution to the disk drive component damage problem. By way of example, it has been discussed in connection with FIG. 1 that prior art techniques employ the back EMF of the spindle motor to park the read/write head whenever a power loss condition is detected. The invention combines, in one embodiment, the microprocessor monitoring circuit with prior art techniques to cause the head to park when either power loss or a microprocessor failure condition is detected, and to cause the spindle motor to be powered down upon microprocessor failure to prevent its destruction.

Figure 2:
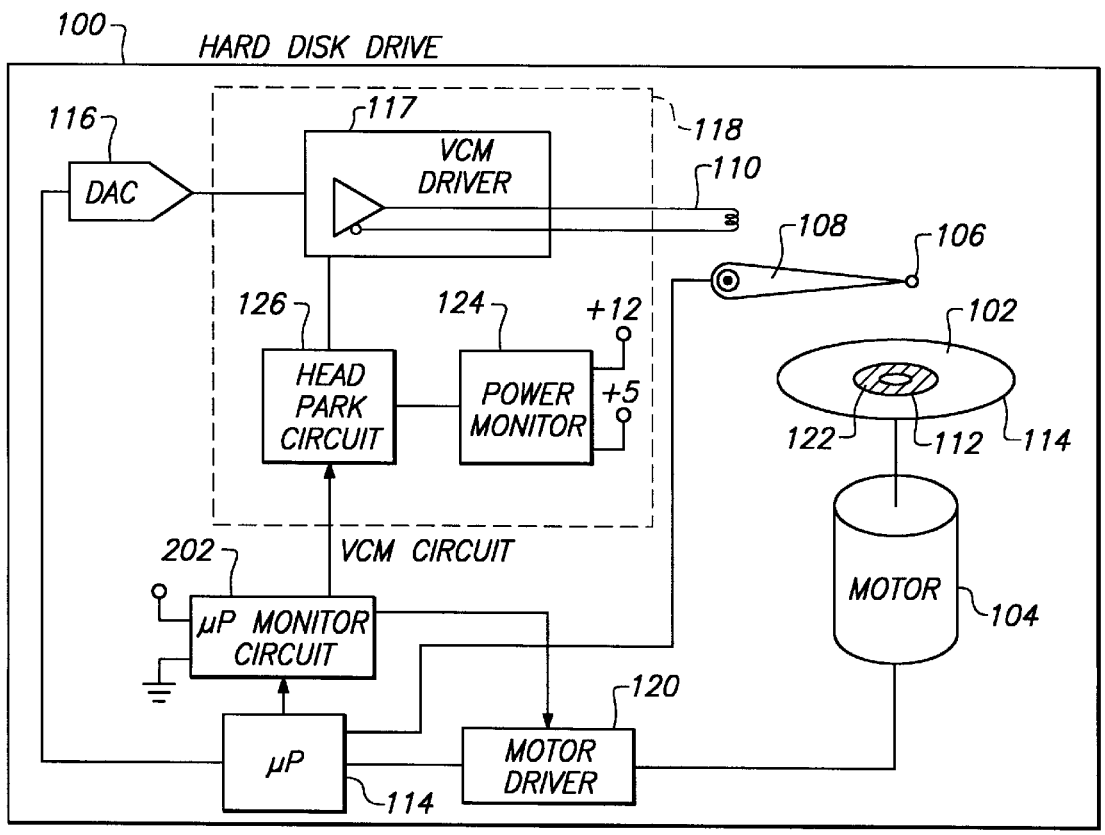
FIG. 2 is a simplified diagram of the hard disk drive of FIG. 1, including circuitry for implementing the inventive technique.

To further illustrate the foregoing, FIG. 2 is a simplified diagram of a hard disk drive 200. In hard disk drive 200, components having like reference numbers with components in hard disk drive 100 of FIG. 1 are arranged substantially the same way and function in a substantially similar manner. Hard disk drive 200 further includes, however, a microprocessor monitoring circuit 202, which is coupled to microprocessor 114 to detect a microprocessor failure condition therein.

If no microprocessor failure is detected, hard disk drive 200 functions substantially in the same manner as discussed in connection with FIG. 1, i.e., microprocessor monitoring circuit 202 is essentially transparent. If microprocessor monitoring circuit 202 detects a microprocessor failure condition, it issues a park command to head park circuit 126. The receipt of the park command causes head park circuit 126 to behave as if it were responding to a power loss condition, i.e., moving actuator arm 108 to park R/W head 106 over the designated landing zone.

It is important to note that once microprocessor monitoring circuit 202 detects the microprocessor failure condition, it parks R/W head 106 over the designated landing zone, e.g., landing zone 122, without requiring further intervention from microprocessor 114. In this manner, the invention addresses the deficiency in prior art solutions, i.e., the inability to handle the situation where there has been no power loss but the microprocessor has failed.

In another advantageous embodiment, microprocessor monitoring circuit 202 also resets spindle motor driver circuit 120 to prevent spindle motor 104 from drawing, due to microprocessor failure, excessive current. In one embodiment, a reset signal is sent from microprocessor monitoring circuit 202 to spindle motor driver circuit 120 responsive to the detection of a microprocessor failure condition. Depending on the spindle driver design selected, the reset signal may be employed to, for example, disable the spindle motor. As can be appreciated by those skilled, this embodiment is highly advantageous because if the spindle motor is allowed to draw an excessive amount of current responsive to spurious data from the failed microprocessor, it may burn up. In such a case, the hard disk drive is essentially fatally damaged even if the read/write head is properly parked since a seized motor will not allow the drive to spin up again.

Note that some conventional circuits, such as data buffering circuits, error correction circuits, amplifying circuits, and others, have been omitted from FIG. 2 in order not to unnecessarily obscure the invention. The construction, function, and use of these circuits in hard disk drives are well documented in the current art. In one embodiment, microprocessor monitoring circuit 202, DAC 116, and others may be integrated, for ease of manufacturing, into a single chip, e.g., an Application-Specific Integrated Circuit (ASIC).

Figure 3:
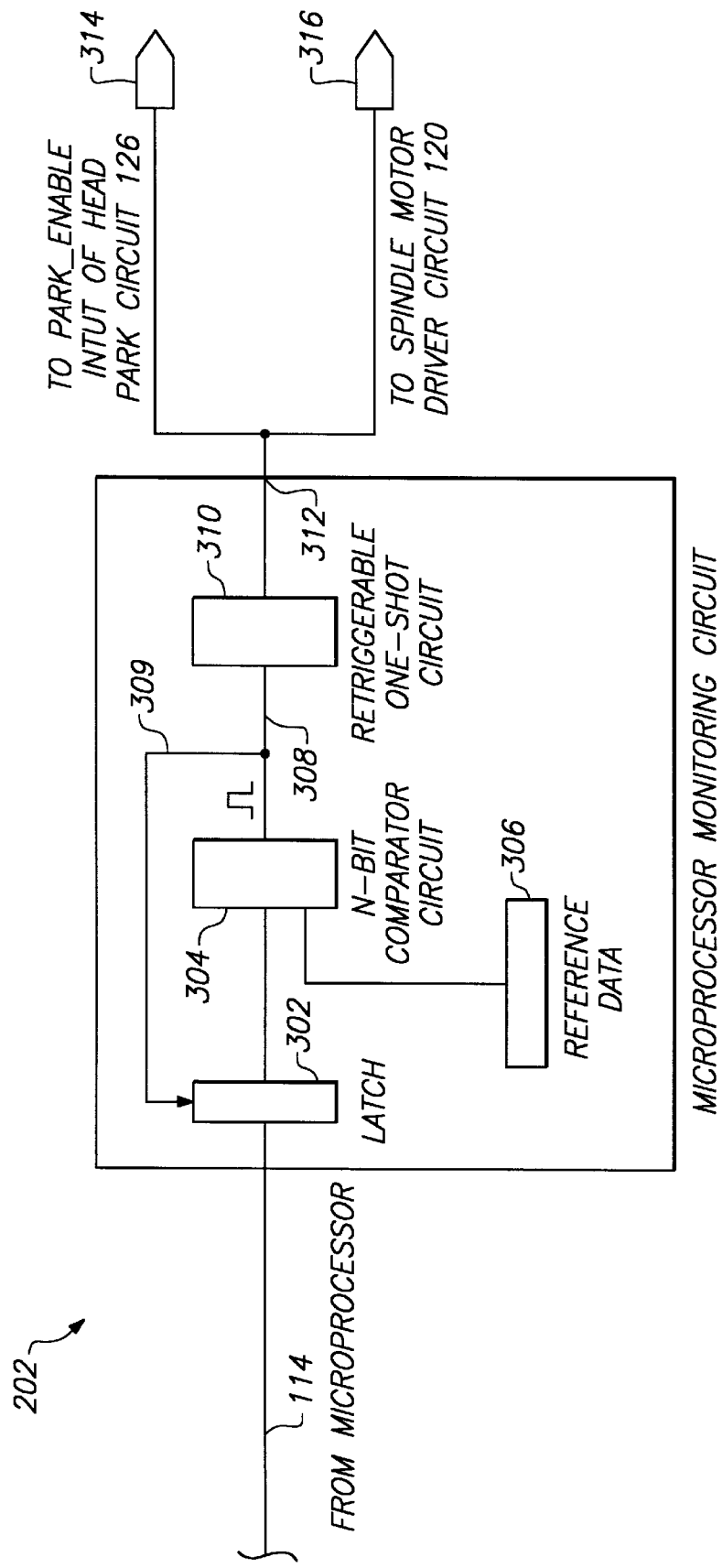
FIG. 3 is a simplified diagram illustrating in detail one implementation of the inventive microprocessor monitoring circuit.

FIG. 3 is a simplified diagram illustrating in detail one implementation of the inventive microprocessor monitoring circuit 202 of FIG. 2. Although not required, microprocessor monitoring circuit 202, DAC 116, among other circuits, have been implemented, in this embodiment, in an Application-Specific Integrated Circuit (ASIC) for reasons of economy and ease of implementation. In FIG. 3, microprocessor 114 is required to send a periodic signal to microprocessor monitoring circuit 202. The periodic signal includes predefined data sent every t seconds, where t is a predefined value. In one embodiment, the predefined data is n-bit wide, where n is an arbitrary, predefined number, e.g., 16 or 32.

The data sent from microprocessor 114 is received by an n-bit latch 302, which forwards it to an n-bit comparator circuit 304. N-bit comparator circuit 304 compares the received data with a reference data 306 previously hard wired, e.g., in an ASIC, and/or stored in memory. If the received data 302 matches reference data 306, n-bit comparator circuit 304 generates a pulse on path 308, which is then received by a retriggerable one-shot circuit 310. Retriggerable one-shot circuit represents, in one embodiment, a 12-bit retriggerable one shot circuit for high accuracy. N-bit latch 302, n-bit comparator 304, and retriggerable oneshot circuit 310 are conventional in construction and may be implemented using any conventional technique, including in an ASIC.

The pulse generated by n-bit comparator circuit 304 acts as a reset signal to reset retriggerable one-shot circuit 310 to keep the output of retriggerable one-shot circuit at pin 312 in a known state. For simplicity of illustration, it is assumed that the known state is low, although retriggerable one-shot circuits designed with a known high state may also be employed. The pulse generated by n-bit comparator circuit 304 is also fed back into n-bit latch 302 (via data path 309) to clear the latch, thereby readying it for receiving data again from microprocessor 114.

If the pulse is not received from comparator circuit 304 within a predefined reset window of retriggerable one-shot circuit 310, output pin 312 changes state, e.g., from low to high in this example. With reference to FIG. 3, the pulse is not generated by comparator circuit 304 when the data sent by microprocessor 114 fails to match with reference data 306. Since microprocessor 114 is required to send out data that matches with reference data 306 every t seconds, its failure to do so indicates that either microprocessor 114 has failed or that the code executing on microprocessor 114 has caused microprocessor 114 to act in an unintended manner. In either event, microprocessor 114 is assumed to have failed by microprocessor monitoring circuit 202.

Output pin 312 of retriggerable one-shot circuit 310 is coupled to the Park_Enable input 314 of head park circuit 126 of FIG. 2. The high state of output pin 312 thus acts as a park command, causing head park circuit 126 to commence parking R/W head 106 over its designated landing zone. Note that once microprocessor monitoring circuit 202 determines that microprocessor 114 has failed, it proceeds to park the read/write head without any further requiring intervention from microprocessor 114.

In the embodiment of FIG. 3, output pin 312 of retriggerable one-shot circuit 310 also couples with the RESET input of spindle motor driver circuit 120. More preferably, output pin 312 of retriggerable one-shot circuit 310 is coupled to input 316 of the DAC that feeds into spindle motor driver circuit 120. The high state of the output pin 312 causes the output of this DAC to go low, thereby resetting spindle motor driver circuit 120 and inhibiting spindle motor 104 (of FIG. 2) from drawing a potentially damaging amount of current irrespective of what microprocessor 114 (which, at this point, is assumed to have failed) may be commanding spindle motor driver circuit 120 to do. Note that once microprocessor monitoring circuit 202 determines that microprocessor 114 has failed, it proceeds to reset spindle motor driver circuit 120 without requiring any further intervention from microprocessor 114.

It is preferable, within performance limits, to make the predefined pattern of data that microprocessor 114 is required to send to microprocessor monitoring circuit 202 periodically as long as possible. A more lengthy bit pattern maximizes the sensitivity with which microprocessor monitoring circuit 202 can detect a microprocessor failure condition, thereby advantageously minimizing an accidental or false trigger if and when the microprocessor fails. If only one bit is required, for example, random pulses sent by microprocessor 114 after it has failed may cause n-bit comparator circuit 304 and retriggerable one-shot circuit 310 to mistakenly believe that microprocessor 114 is still functioning properly. If more bits are required, the possibility that a failed microprocessor just happens to send out the matching data is substantially minimized.

It is recognized, however, that the width of the data bus between microprocessor 114 and microprocessor monitoring circuit 202 may limit the number of bits that may be sent simultaneously. In one embodiment, the invention allows the required data to be sent to the n-bit latch over many data cycles of the microprocessor. Additionally or alternatively, one set of data may be sent to "open up" n-bit latch 302 and prepares it for the next set of data in the next data cycle which represents, for example, the required data. In either case, the total number of bits sent by microprocessor 114 and compared by comparator circuit 304 is greater than the width of the data bus that couples between microprocessor 114 and microprocessor monitoring circuit 202. In one example 32 bits of data are sent by microprocessor 114 and received by microprocessor monitoring circuit 202 in two data cycles using a data bus that is only 16 bits wide.

As mentioned earlier, microprocessor 114 is required to send the data to microprocessor monitoring circuit 202 every t seconds. Although the time value t may have any value, if t is set too high a value, too long a time may elapse between the time microprocessor 114 starts to fail and the time it is detected and acted upon by microprocessor monitoring circuit 202. In the worst case scenario, the microprocessor could fail and cause the read/write head to crash land on the data zone on the surface of disk 102 before the microprocessor failure condition can be detected by microprocessor monitoring circuit 202.

However, the value t should not be so small as to impose an excessive drain on the bandwidth of microprocessor 114. In one embodiment, t may be set to be about equal to the time it takes for spindle motor 104 to complete one rotation. If the spindle motor normally spins at 7200 RPM, for example, t may be set to about 1/7200 or about 8.333 milliseconds. Of course the value of t may be smaller if there is sufficient bandwidth in microprocessor 114. Alternatively the value of t may be larger if a larger value does not unduly delay the detection of the microprocessor failure condition to the detriment of the hard disk components.

In some systems, microprocessor 114 is required to periodically send data to spindle motor driver circuit 120 to adjust its rotation speed. The rotational speed adjustment data may be sent once every rotation or every m rotations where m is some arbitrary, predefined number which may be larger or smaller than 1. In most cases, the frequency with which microprocessor 114 sends out rotational speed adjustment data to spindle motor driver circuit 120 is sufficiently fast or even faster than required for the proper detection of a microprocessor failure condition.

In one embodiment, the invention advantageously takes advantage of the software subroutines already existing for this rotational speed adjustment task and simply adds a line to the codes. The additional line may request microprocessor 114 to send out the predefined data to microprocessor monitoring circuit 202 every time microprocessor 114 sends out data to spindle motor driver circuit 120. This way, the amount of code changes that needs to be made to the existing software in order to accommodate the inventive microprocessor monitoring circuit is minimal, which advantageously lowers the cost of implementing the invention in existing drives.

The reset window of retriggerable one-shot circuit 310 may be set to any value that is larger than the value of t (i.e., the period of the data pattern sent from microprocessor 114 to microprocessor monitoring circuit 202). Again, it is important that value chosen for the reset window not be so small as to impose an undue burden on microprocessor 114 (which must then send its data to the microprocessor monitoring circuit within a time t smaller than the value chosen for the reset window to keep the retriggerable circuit from tripping). The value chosen for the reset window of retriggerable one-shot circuit 310 must not also be so large as to unduly delay the detection of the microprocessor failure condition to the detriment of the hard disk components. In the example wherein the time t is set at about 8.3 milliseconds, a reset window of about 26.2 milliseconds for the retriggerable one-shot circuit works well.

Figure 4:
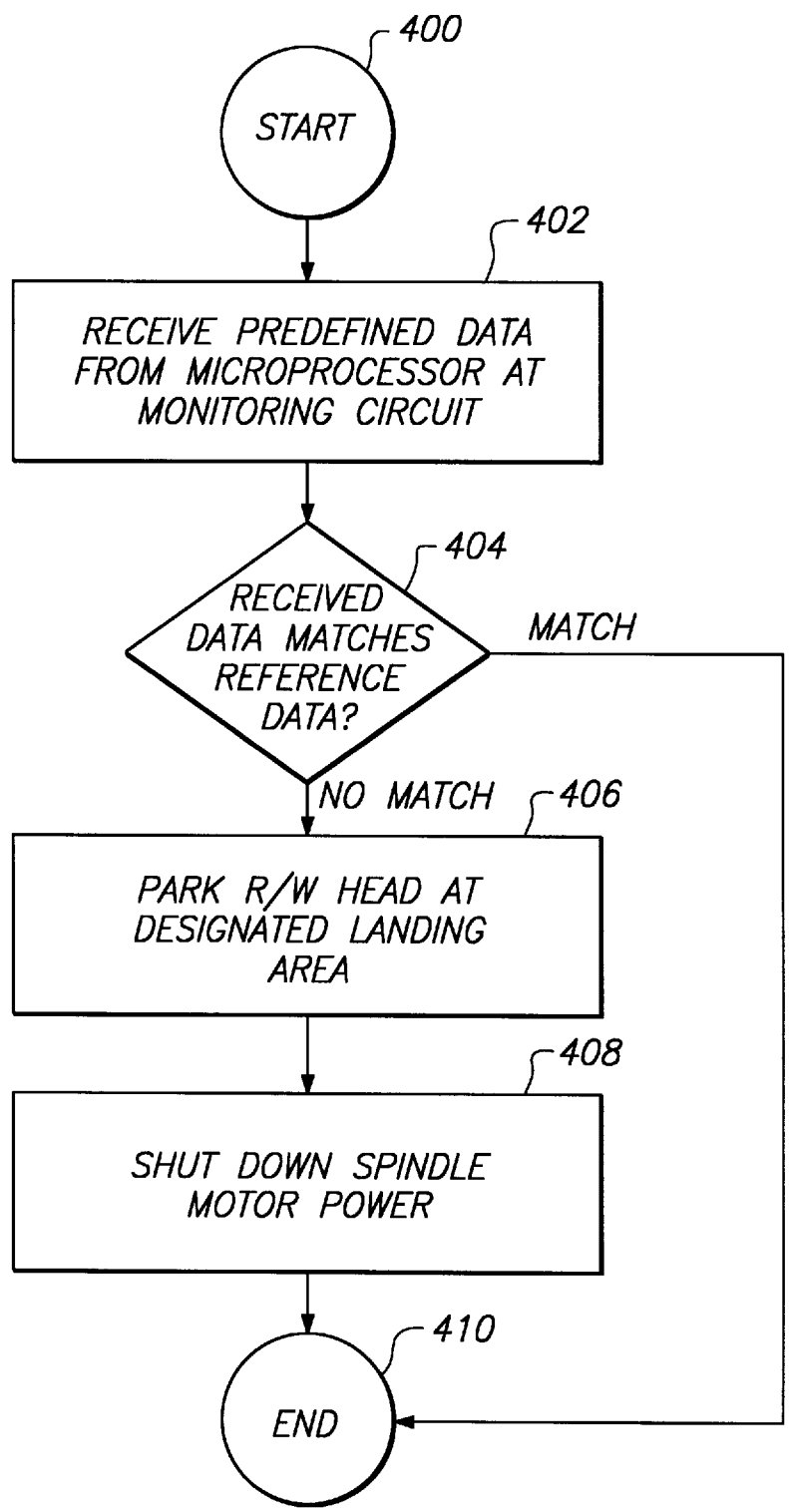
FIG. 4 illustrates, in accordance with one embodiment of the present invention, the steps involved in allowing the inventive microprocessor monitoring circuit to monitor and respond to a microprocessor failure condition. I

FIG. 4 illustrates, in accordance with one embodiment of the present invention, the steps involved in allowing the inventive microprocessor monitoring circuit to monitor and respond to a microprocessor failure condition. In step 402, the microprocessor monitoring circuit receives the predefined data from the microprocessor. The received data is then compared against reference data to determine whether there is a match (step 404). If there is a match, the microprocessor monitoring circuit essentially does not take any action since it assumes that the microprocessor is functioning properly.

If there is not a match, the microprocessor monitoring circuit then proceeds to park, in step 406, the read/write head, e.g., head 106, above the designated landing zone to prevent it from crash landing in the delicate data zone. The method also arrives at step 406 if the required predefined data is not received from the microprocessor within the predefined time period. As mentioned earlier, the parking of the head at a designated textured landing zone also avoids problems due to the aforementioned stiction problem. In step 406, the parking of the read/write head is accomplished without requiring intervention by the microprocessor (which is assumed to have failed at this point).

In an optional step 408, the spindle motor power is shut down to prevent damage to the spindle motor. Again, the microprocessor monitoring circuit shuts down the spindle motor power without requiring intervention from the microprocessor once it determines that a microprocessor failure condition has been detected.

Figure 5:
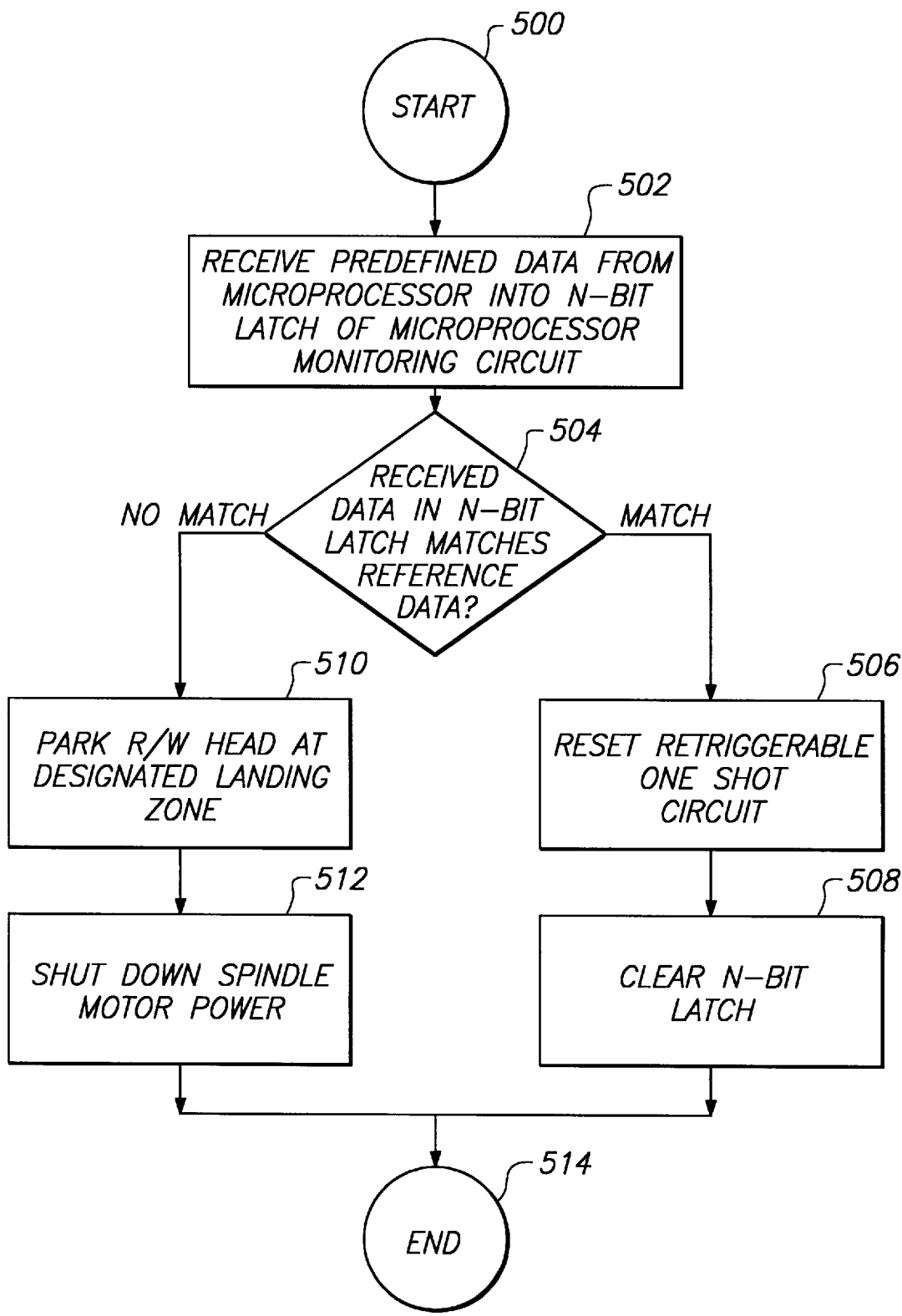
FIG. 5 illustrates the steps involved, in accordance with another embodiment of the present invention, for detecting the microprocessor failure condition and responding to such condition using a comparator circuit and a retriggerable one-shot circuit.

FIG. 5 illustrates the steps involved, in accordance with another embodiment of the present invention, for detecting the microprocessor failure condition and responding to such a detection using a comparator circuit and a retriggerable one-shot circuit. A suitable hardware implementation of this technique has been described earlier in connection with FIG. 3.

In step 502, the microprocessor monitoring circuit receives the predefined data from the microprocessor into an n-bit latch. The received data in the n-bit latch is then compared, using a comparator circuit, against stored reference data to determine whether there is a match (step 504). If there is a match, the microprocessor monitoring circuit proceeds to step 506 to reset the retriggerable one-shot circuit to prevent it from tripping. Either immediately before or after step 506, the n-bit latch is cleared to prepare it to receive another set of predefined data from the microprocessor (step 508).

If there is not a match, the microprocessor monitoring circuit then proceeds to park, in step 510, the read/write head, e.g., head 106, above the designated landing zone to prevent it from crash landing in the delicate data zone. The method also arrives at step 510 if the retriggerable one-shot circuit does not get reset within its reset window. In step 510, the parking of the read/write head is accomplished without requiring intervention by the microprocessor (which is assumed to have failed at this point).

In an optional step 512, the spindle motor power is shut down to prevent damage to the spindle motor. Again, the microprocessor monitoring circuit shuts down the spindle motor power without requiring intervention from the microprocessor once it determines that a microprocessor failure condition has been detected.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a hard disk drive having a microprocessor, at least one read/write head and at least one data storage disk, a method for preventing damage to said hard disk drive when said microprocessor fails, comprising:
coupling a microprocessor monitoring circuit to said microprocessor;
configuring said microprocessor monitoring circuit to detect a microprocessor failure condition on said microprocessor; and
coupling said microprocessor monitoring circuit to a head park circuit, said head park circuit is configured to park said at least one read/write head of said hard disk drive over a designated zone defined on said at least one data storage disk when said microprocessor failure condition is detected by said microprocessor monitoring circuit.

2. The method of claim 1 further comprising:
coupling said microprocessor monitoring circuit to a spindle motor driver circuit, said spindle motor driver circuit being configured for controlling a spindle motor coupled to said at least one data storage disk, whereby said microprocessor monitoring circuit inhibits said spindle motor driver circuit, when said microprocessor failure condition is detected by said microprocessor monitoring circuit, from allowing excessive current to be drawn by said spindle motor.

3. The method of claim 1 wherein said microprocessor monitoring circuit is configured to receive from said microprocessor predefined data within a predefined time period, said microprocessor failure condition being met if said predefined data receive from said microprocessor fails to match predefined reference data known to said microprocessor monitoring circuit or if said predefined data fails to be received within said predefined time period.

4. The method of claim 1 wherein said microprocessor monitoring circuit is configured for receiving from said microprocessor predefined data within a predefined time period, said microprocessor failure condition being met if said predefined data receive from said microprocessor fails to match predefined reference data known to said microprocessor monitoring circuit or if said predefined data fails to be received within said predefined time period.

5. The method of claim 1 further comprising:
coupling a latch circuit of said microprocessor monitoring circuit to said microprocessor, said latch circuit being configured for receiving from said microprocessor predefined data;
coupling a comparator circuit of said microprocessor monitoring circuit with said latch circuit, said comparator circuit being configured to compare said predefined data with reference data known to said microprocessor monitoring circuit and outputting at a comparator output a first pulse if said predefined data matches said reference data; and
coupling a retriggerable one-shot circuit of said microprocessor monitoring circuit to an output of said comparator circuit, said retriggerable one-shot circuit being configured to be reset if said first pulse is received by said retriggerable one-shot circuit within a reset window of said retriggerable one-shot circuit, said retriggerable one-shot circuit being further configured to change a state of an output of said retriggerable one-shot circuit to a given state if said first pulse is not received by said retriggerable one-shot circuit within said reset window, wherein said given state is configured to cause said parking.

6. The method of claim 5 wherein said latch is reset responsive to said first pulse.

7. An apparatus for preventing damage to components of a hard disk drive having a microprocessor when said microprocessor fails, said hard disk drive further including at least one read/write head and a data storage disk having a designated parking zone, said apparatus comprising:
a microprocessor monitoring circuit configured to be coupled to said microprocessor, said microprocessor monitoring circuit being configured for detecting a microprocessor failure condition in said microprocessor, and
a head park circuit coupled to said microprocessor monitoring circuit, said head park circuit being configured to receive a park command from said microprocessor monitoring circuit when said microprocessor failure condition is detected by said microprocessor monitoring circuit, said head park circuit, upon a receipt of said park command, parks said at least one read/write head of said hard disk drive over said designated parking zone, whereby said microprocessor monitoring circuit issues said park command to cause said parking of said at least one read/write head without intervention from said microprocessor when said microprocessor failure condition is detected by said microprocessor monitoring circuit.

8. The apparatus of claim 7 wherein said microprocessor monitoring circuit is configured for receiving from said microprocessor predefined data within a predefined time period, said microprocessor failure condition being met if said predefined data received from said microprocessor fails to match predefined reference data known to said microprocessor monitoring circuit or if said predefined data fails to be received within said predefined time period.

9. The apparatus of claim 7 wherein said microprocessor monitoring circuit comprises:
a latch circuit coupled to said microprocessor, said latch circuit being configured for receiving from said microprocessor predefined data;
a comparator circuit coupled with said latch circuit, said comparator circuit being configured to compare said predefined data with reference data known to said microprocessor monitoring circuit and outputting at a comparator output a first pulse if said predefined data matches said reference data; and
a retriggerable one-shot circuit coupled to an output of said comparator circuit, said retriggerable one-shot circuit being configured to be reset if said first pulse is received by said retriggerable one-shot circuit within a reset window of said retriggerable one-shot circuit, said retriggerable one-shot circuit being further configured to change a state of an output of said retriggerable one-shot circuit to a given state if said first pulse is not received by said retriggerable one-shot circuit within said reset window, wherein said given state is configured to cause said parking.

10. The apparatus of claim 9 wherein said latch circuit is reset responsive to said first pulse.

11. The apparatus of claim 9 wherein said retriggerable one-shot circuit is a 12-bit retriggerable one-shot circuit.

12. The apparatus of claim 8 wherein said microprocessor sends said predefined data to said microprocessor monitoring circuit every time said microprocessor sends a rotation speed correction data to a spindle motor driver circuit coupled to a spindle motor of said hard disk drive.

13. The apparatus of claim 7 wherein said microprocessor monitoring circuit is coupled to a spindle motor driver circuit to permit said microprocessor monitoring circuit to inhibit said spindle motor driver circuit, when said microprocessor failure is detected by said microprocessor monitoring circuit, from allowing excessive current to be drawn by a spindle motor controlled by said spindle motor driver circuit.

14. An apparatus for preventing damage to components of a hard disk drive, said hard disk drive having a microprocessor, at least one read/write head, and a data storage disk having thereon a designated parking zone, comprising:

means, coupled to said microprocessor, for monitoring a microprocessor failure condition in said microprocessor; and a head park circuit coupled to said monitoring means, said monitoring means being configured to issue a park command to said head park circuit when said microprocessor failure condition is detected by said monitoring means, said head park circuit being configured for parking, upon receipt of said park command from said monitoring means, said read/write head over said designated parking zone, whereby said monitoring means issues said park command to cause said parking without intervention from said microprocessor when said microprocessor failure condition is detected by said monitoring means.

15. The apparatus of claim 14 wherein said monitoring means is further coupled to a spindle motor driver circuit, said spindle motor driver circuit being configured for controlling a spindle motor coupled to said data-containing disk, wherein said monitoring means inhibits said spindle motor driver circuit, when said microprocessor failure is detected by said monitoring means, from allowing excessive current to be drawn by said spindle motor.

16. The apparatus of claim 14 wherein said monitoring means is configured for receiving from said microprocessor predefined data within a predefined time period, said microprocessor failure condition being met if said predefined data fails to match reference data known to said monitoring means or if said predefined data fails to be received within said predefined time period.

17. The apparatus of claim 14 wherein said monitoring means comprises:

latch means coupled to said microprocessor, said latch means being configured for receiving from said microprocessor predefined data;

comparator means coupled with said latch means, said comparator means being configured to compare said predefined data with reference data known to said monitoring means and outputting at a comparator output of said comparator means a first pulse if said predefined data matches said reference data; and resetable means coupled to an output of said comparator circuit, said resetable means being configured to be reset if said first pulse is received by said resetable means within a reset window of said resetable means, said resetable means being further configured to change a state of an output of said resetable means to a given state if said first pulse is not received by said resetable means within said reset window, wherein said given state is configured to cause said parking.

18. The apparatus of claim 17 wherein said microprocessor sends said predefined data to said monitoring means each time said microprocessor sends a rotation speed correction data to a spindle motor driver circuit coupled to a spindle motor of said hard disk drive.

19. The apparatus of claim 17 wherein said latch means is reset responsive to said first pulse.

20. The apparatus of claim 19 wherein said monitoring means is further coupled to a spindle motor driver circuit, said spindle motor driver circuit being configured for controlling a spindle motor coupled to said data-containing disk, wherein said monitoring means inhibits said spindle motor driver circuit, when said microprocessor failure is detected by said monitoring means, from allowing excessive current to be drawn by said spindle motor.

\* \* \* \* \*